US006665327B1

(12) United States Patent
von Borstel et al.

(10) Patent No.: US 6,665,327 B1
(45) Date of Patent: Dec. 16, 2003

(54) GAS LASER DEVICE

(75) Inventors: Michael von Borstel, Pleidelsheim (DE); Detlef Henschler, Ditzingen (DE)

(73) Assignee: Trumpf GmbH & Co., Ditzingen (DE)

( * ) Notice: Subject to any disclaimer, the term of this patent is extended or adjusted under 35 U.S.C. 154(b) by 0 days.

(21) Appl. No.: 09/284,319

(22) PCT Filed: Oct. 24, 1997

(86) PCT No.: PCT/EP97/05891

§ 371 (c)(1),
(2), (4) Date: Jun. 24, 1999

(87) PCT Pub. No.: WO98/19373

PCT Pub. Date: May 7, 1998

(30) Foreign Application Priority Data

Oct. 30, 1996 (DE) ..................................... 296 18 887 U

(51) Int. Cl.[7] ................................................. H01S 3/03
(52) U.S. Cl. ............................. 372/61; 372/34; 372/55; 372/58

(58) Field of Search .............................. 372/61, 55, 58, 372/34

(56) References Cited

U.S. PATENT DOCUMENTS

| 4,242,646 A | * 12/1980 | Macken ......................... 372/58 |
| 4,242,647 A | * 12/1980 | Macken ......................... 372/58 |
| 4,500,998 A | * 2/1985 | Kuwabara et al. ............. 372/58 |
| 4,504,954 A | * 3/1985 | Guers et al. ................... 372/58 |

* cited by examiner

*Primary Examiner*—Leon Scott, Jr.
(74) *Attorney, Agent, or Firm*—Pepe & Hazard LLP

(57) ABSTRACT

A spiral-type guide member having a spiral channel extending about an open center portion is provided adjacent the gas inlet end of the laser discharge tube of a gas laser assembly. This guides the entering gas stream about the periphery of the laser discharge tube to improve the distribution of the power of the laser beam over the cross section of the laser discharge tube to the discharge tube of the laser beam 113 is provided for the laser gas in the feed line 123, through which at least part of the laser gas is fed to the laser-discharge tube 103.

8 Claims, 4 Drawing Sheets

GAS LASER DEVICE

BACKGROUND OF THE INVENTION

The invention concerns a gas laser assembly with at least one laser discharge tube with laser gas flowing through it in the flow direction, and in which at least one laser beam runs in the direction of the axis of the discharge tube, and at least one feed line for laser gas opens into the laser discharge tube through which the laser discharge tube is connected to a pressure source for laser gas, for example a laser gas pump, and the laser gas is introduced into the laser discharge tube.

In the case of a known generic gas laser arrangement, the a laser gas circulates by means of a laser gas pump. A heat exchanger is provided, both coming, between the laser gas pump and the laser discharge tube, i.e., in the feed line for the laser gas, and going, between the laser discharge tube and the laser gas pump. As a result, the laser gas that is heated inside the laser discharge tube when the laser arrangement is operating is cooled. The cooled laser gas is introduced into the laser discharge tube through a tubular section of the feed line, whose axis lies in a plane with the discharge tube axis and runs perpendicular to it.

Since the feed line extends at an angle to the laser discharge tube, at least with the tubular section described above, the laser gas entering the laser discharge tube experiences a deflection in its flow, namely with a deflection in the flow direction inside the discharge tube. Because of this, at least in the area of the laser discharge tube adjacent the opening to the feed line, when seen in cross section, the flow ratios for the laser gas introduced into the laser tube are uneven. This results in an uneven beam intensity profile, i.e., a non-uniform distribution of the power of the laser beam, over the cross section of the laser discharge tube.

This invention has set the goal of making an improvement in the distribution of the power of the laser beam over the cross section of the discharge tube.

SUMMARY OF THE INVENTION

The invention solves this problem in a gas laser arrangement of the type described at the beginning, by providing in the feed line to the laser discharge tube at least one spiral guide running about an open central cross section to the discharge tube. At least some of the laser gas is fed to the laser discharge tube through the spiral guide. By running at least some of the laser gas introduced into the laser discharge tube along a spiral guide path, especially in the area where the feed line opens into the laser discharge tube and in the section of the laser discharge tube adjacent that area, more uniform flow ratios for the laser gas are produced. In turn, this produces a distribution of the laser gas power over the discharge tube cross section that is relatively even. In addition, the spiral guide is characterized by the fact that a relatively long route for the laser gas is available with a small structural volume.

The invention offers a number of ways for making the spiral guide for the laser gas. Thus, the guide can be made by a corresponding machined spiral groove or channel for the guide track or by inserting a separate spiral-shaped guide element in the feed line. For example, it is conceivable to use a corresponding screw-shaped or spiral-shaped guide tube. as a spiral-type guide for the laser gas, the invention preferably has a corresponding open central portion aligned with the discharge tube for the laser beam. Because of its geometry, this type of guide channel is comparable to a guide thread or a section of a guide thread.

To achieve the desired guide effect with optimum results, the depth of this type of guide thread or channel is chosen so that it is relatively large. The invention provides that the depth of the guide channel be at least one fourth the inner diameter of the accompanying laser discharge tube.

Another version of the invention provides that the spiral-type guide for the laser gas have at least one corresponding guide spiral channel on the inner wall of the feed line for laser gas. The design and alignment of the guide spiral can influence the flow ratios produced.

One preferred embodiment of the gas laser arrangement in the invention is characterized by the fact that the spiral-type guide channel for the laser gas is provided in a guide tube forming the inside wall of at least one part of the feed line for the laser gas and disposed prior to the laser discharge tube in the direction in which the laser gas flows. The functional separation described between the laser discharge tube and the guide pipe makes sure that the laser gas flow, as soon as it reaches the area of the laser assembly in which the discharge takes place, is already optimized. It is also possible to combine guide tubes with different designs with the same laser discharge tube or to vary the flow ratios by corresponding alignment of the guide pipe in relation to the laser discharge tube to which it is connected.

To make the laser gas flow take the flow direction desired in the guide pipe along the shortest possible flow path, the invention provides that the guide tube have an inlet for the laser gas which is tangential to its cross section and the spiral guide channel in the direction in which the laser gas flows. The features mentioned prevent unwanted deflection and swirling when the laser gas enters the guide tube and thus create a condition which requires that the laser gas flow be guided over only a short distance for its alignment.

In this sense, another variation of the invention makes use of the feature that the inlet for the laser gas in the guide tube is designed as a tubular inlet line and the axis of the inlet line runs in the direction of the section of the spiral guide connected to the inlet line. This avoids unwanted unevenness of flow when the laser gas enters the guide tube which would, if necessary, make it difficult to produce optimized flow ratios in the laser discharge tube downstream from the guide pipe.

According to the invention, the spiral-type guide can be designed to be single-threaded. In one preferred embodiment, however, a multi-threaded spiral-type guide is provided.

The flow ratios produced can be influenced by the geometry of the spiral-type guide. Structurally very simple embodiments are produced when the spiral-type guide is designed with a constant diameter of the free cross section at the discharge tube of the laser beam and/or with a constant spiral pitch. When the diameter of the free cross section of the spiral-type guide is constant, the guide path takes a spiral course. But, as stated already above, the guide track can, if necessary, also have a spiral shape, and then the diameter of the free cross section of the spiral-type guide can change in the direction of the spiral axis. According to the invention, the spiral pitch can also be chosen so that it changes in the direction of the axis of the spiral.

Finally, it is an advantage for the flow ratios in the laser-discharge tube if—as also provided in the invention— the spiral axis of the spiral-type guide runs in the flow direction and preferably coincides with the discharge-tube axis.

BRIEF DESCRIPTION OF THE DRAWINGS

The present invention will be explained in greater detail below by reference to the schematic drawings of exemplary embodiments.

DETAILED DESCRIPTION OF THE PREFERRED EMBODIMENTS

Figure 1:
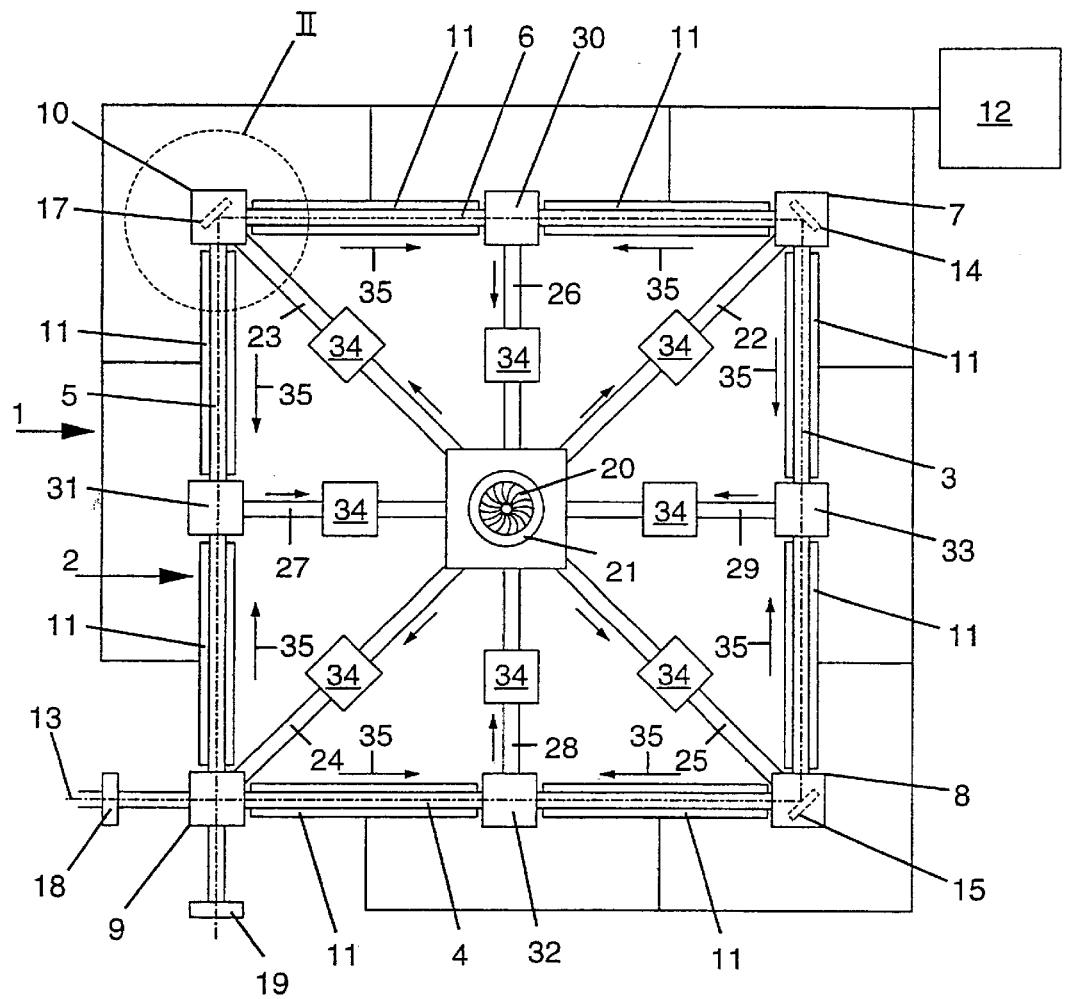
FIG. 1 is a schematic illustration of a so-called "folded" gas laser assembly embodying the present invention.

The gas laser assembly 1 of FIG. 1 includes a square folded laser discharge unit 2 with four laser discharge tubes 3, 4, 5, 6 connected to one another by the corner housings 7, 8, 9, 10. Electrodes 11 on their outer walls are assigned in pairs and are connected to a high-frequency generator 12. A laser beam 13 running in the direction of the axes of the laser discharge tubes 3, 4, 5, 6 is shown in dashes in FIG. 1. Deflection mirrors 14, 15, 17 in the corner housings 7, 8, 10 are used to deflect the laser beam 13 by 90°. The laser beam 13 is uncoupled at an uncoupling mirror 18. A return mirror 19 is adjacent to the uncoupling mirror 18 in the known way.

In the center of the folded laser discharge assembly 2 is a radial fan 20 which provides the pressure source for the laser gas. It is driven by a fan motor 21 and connected to the corner housings 7, 8, 9, 10 by feed lines 22, 23, 24, 25 for the laser gas. Suction lines 26, 27, 28, 29 extend between the suction housings 30, 31, 32, 33 and the radial fan 20. Heat exchangers 34 are provided both in the feed lines 22, 23, 24, 25 and in the suction lines 26, 27, 28, 29. The direction in which the laser gas flows inside the laser discharge tubes 3, 4, 5, 6 is shown by the arrow 35. Other arrows symbolize the flow direction of the laser gas in the feed lines 22, 23, 24, 25 and in the suction lines 26, 27, 28, 29.

Figure 3:
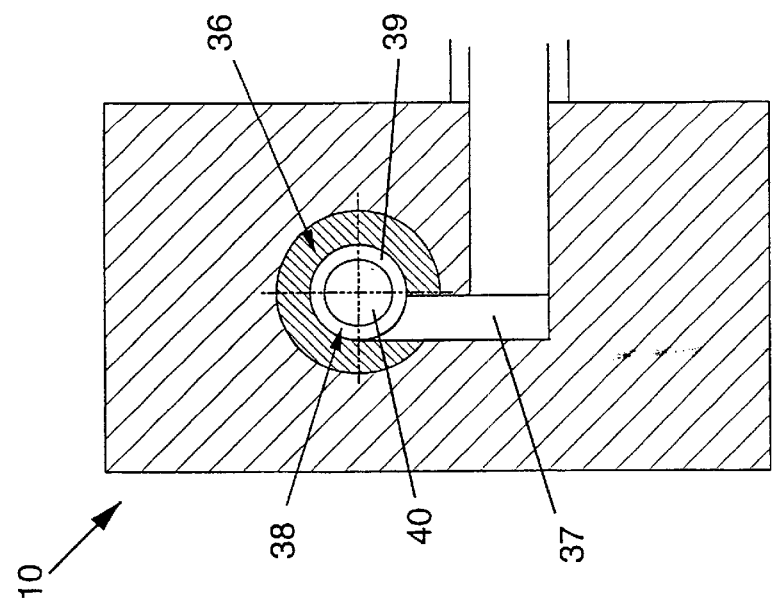
FIG. 3 is a cross sectional view along the line III—III in FIG. 2.
Figure 2:
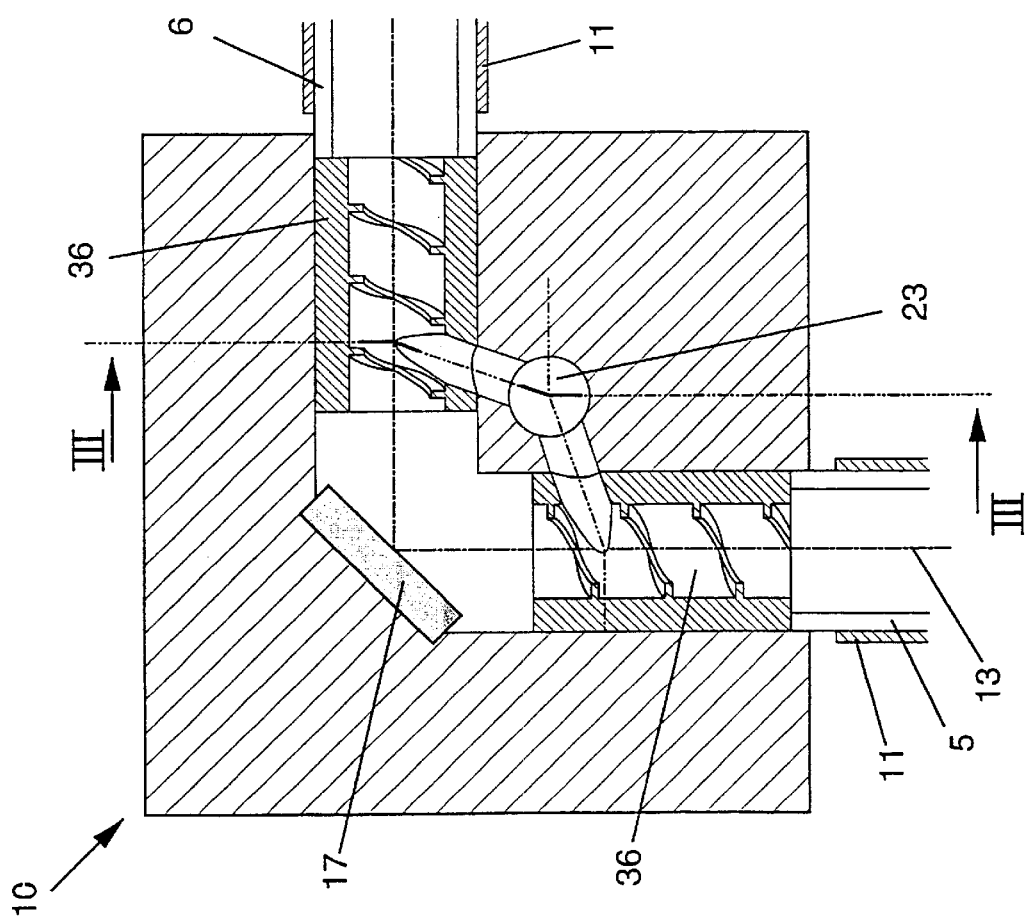
FIG. 2 is a fragmentary sectional view of the corner area II in FIG. 1 with two guide pipes.

Starting from the radial fan 20, laser gas is transported by the feed lines 22, 23, 24, 25 through the respective heat exchanger 34 to the corner housings 7, 8, 9, 10. There, as can be seen in FIG. 2, the laser gas stream is split into two partial streams, each of which is fed to a guide tube 36 which is an integral part of the respective feed line 22, 23, 24, 25. In FIG. 3, the respective partial stream of laser gas enters the guide pipe 36 through a tubular tangential inlet line 37. Each guide pipe 36 is adjacent the laser discharge tube 3, 4, 5, 6 in the direction 35 in which the laser gas flows therethrough. FIG. 2 shows the laser-discharge tubes 5, 6 and the associated guide pipes 36 in the corner housing 10. Guide tubes 36 opposite one and the same laser discharge tube 3, 4, 5, 6 are shown as mirror images in a plane running perpendicular to the plane of the drawing of FIG. 1 and perpendicular to the respective axis of the discharge tube.

Figure 4:
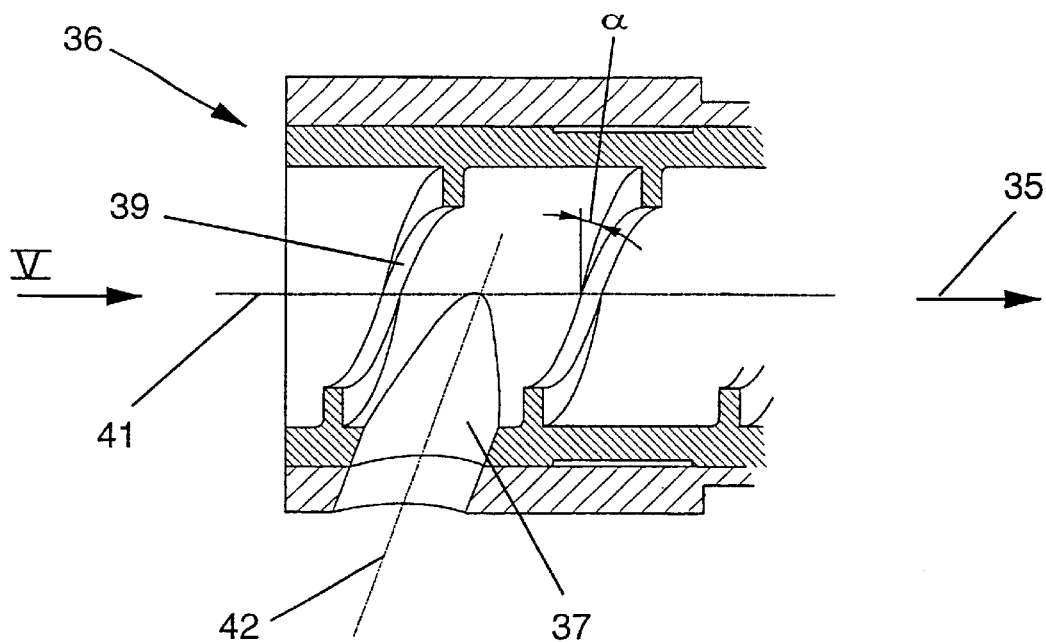
FIG. 4 is an enlarged longitudinal cross sectional view of one of the guide pipes in FIG. 2.
Figure 5:
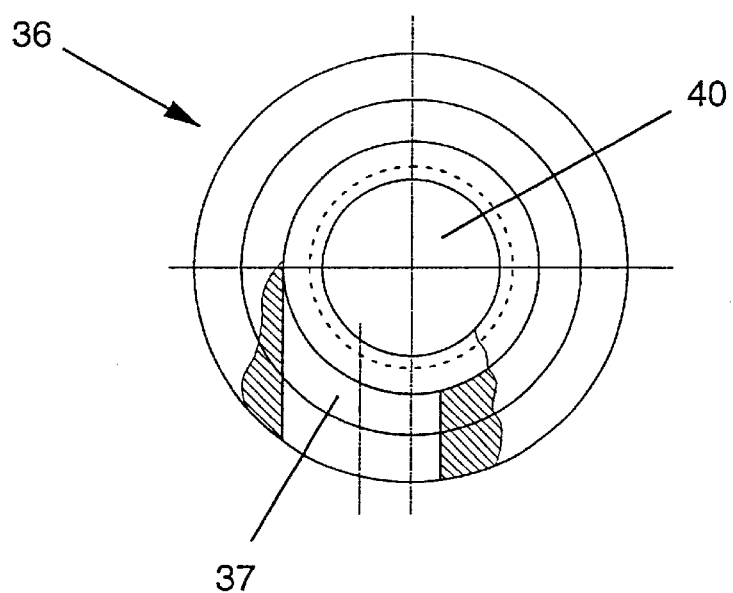
FIG. 5 is an end view of the guide pipe in FIG. 4 in the direction of arrow V in FIG. 4.

In FIG. 3, a spiral-type guide 38 for the laser gas is provided on the inside of each guide pipe 36 which is provided by a spiral guide channel 39 on the inner wall of the guide pipe 36 which runs around a free or open central area 40 to the discharge tube of the laser beam 13. The adjacent sections of the spiral guide channel 39 border a guide channel for laser gas which is open to the open center 40 and has the shape of a spiral thread. The axis 41 of the guide spiral channel 39 coincides with the axis of the laser discharge tube to which it connects and the axis of the laser beam 13. The axis 42 of the tangential inlet line 37 is inclined to the vertical as seen in FIG. 4 and runs in the direction of the section of the guide spiral channel 39 connecting to the tangential inlet line 37. The diameter of the guide spiral 39 and thus the spiral-type guide 38 indicates: the open central area 40 extending to the discharge tube of the laser beam 13 is constant in the direction of the axis 41 of the guide spiral channel 39. The same is true of the pitch of the guide spiral channel 39, which is shown in FIG. 4 by the angle of pitch α.

The stream of laser gas produced by the radial fan 20 is deflected when it enters the guide pipe by the tangential inlet line 37 in the direction of the section of the guide spiral channel 39 attached to it. This in turn leads at least the radially outer part of the stream of laser gas adjacent to the guide pipe 36 into a spiral path in the direction of the laser discharge tube. As a result, the peripheral portion of the stream of laser gas then enters the laser discharge tube with a corresponding spiral direction, and the gas is substantially uniformly distributed about the cross section of the laser discharge tube. Because of the ratios of the streams inside the laser discharge tubes 3, 4, 5, 6, there is an even distribution of the power of the laser beam over its cross section.

Each partial stream of laser gas that enters through a guide tube 36 into the laser discharge tube to which it is connected meets as seen in FIG. 1, inside of the suction housing 30, 31, 32, 33 with the partial stream of laser gas introduced through the guide pipe 36 of the corner housing 7, 8, 9, 10 opposite the same laser discharge tube. The combined partial streams are then directed through the suction lines 26, 27, 28, 29, and the heat exchanger 34 connected in them to the radial fan 20.

Figure 6:
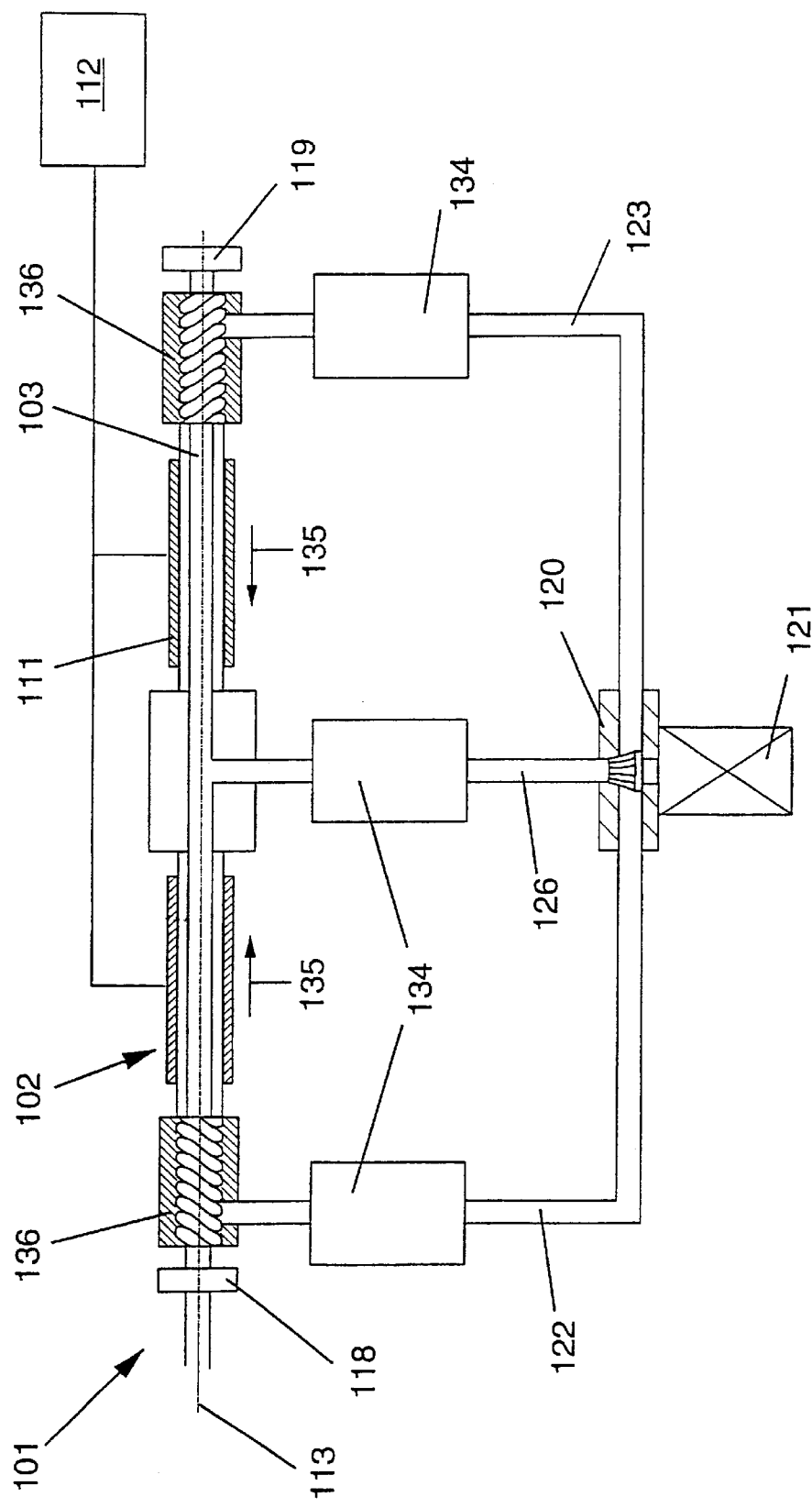
FIG. 6 is a schematic illustration of another gas laser assembly embodying the present invention.

FIG. 6 shows a gas laser assembly 101 which, instead of the folded laser discharge assembly loading unit 2 in FIG. 1, includes a straight-line discharge assembly 102 with a single laser discharge tube 103. Inside the laser discharge tube 103 runs a laser beam 113 which is uncoupled by an uncoupling mirror 118. Opposite the uncoupling mirror 118 is a return mirror 119. The voltage needed is applied to electrodes 111 on the outer wall of the laser discharge tube 103 by means of a high frequency generator 112.

A pressure source for laser gas in the form of a radial fan 120 feeds laser gas through feed lines 122, 123 to the inside of the laser discharge tube 103 and sucks heated laser gas out of it through a suction line 126. The direction in which the laser gas flows inside the laser discharge tube 103 is symbolized by the arrow 135. A heat exchanger 134 is connected in the feed lines 122, 123 and in the suction line. The streams of laser gas that enter the laser discharge tube 103 are aligned properly in the manner described in FIGS. 1 to 5 using corresponding guide tubes 136 with spiral-type guide channels for the laser gas.

The spiral-type guide for laser gas can also be formed by inserting a spiral element in the form of a screw, spring or a cold spiral and/or bounded by a perforated tube against the open cross section to the discharge tube for the laser beam.

The passage of a outer portion of the laser gas through the channel of the spiral guide ensures good distribution of the gas about the periphery as it enters the laser discharge tube. Although this portion of the gas has a spiral component of motion as it enters the laser discharge tube, it does not produce unwanted turbulence as the gas flows though the tube.

By improving the uniformity of the laser gas distribution and flow though the cross section of the laser discharge tube, the profile of the laser beam intensity is significantly improved.

Having thus described the invention, what is claimed is:

1. In a gas laser, the combination comprising:
   (a) a laser discharge tube providing a generally cylindrical cavity and having a gas inlet at one end and a gas outlet at the other end for flow of gas in said cavity in a direction from said inlet to said outlet along the axis of said tube;
   (b) a spiral guide having one end contiguous to said gas inlet of said laser discharge tube and having its spiral axis coaxial with said tube axis, said spiral guide providing an open central portion and having a helical guide channel formed in the inner surface thereof and extending to said inlet end of said laser tube cavity to provide a spiral path thereabout, said channel and open central position of said spiral guide communicating with said cavity of said laser discharge tube, said spiral path having a helical axis extending in the direction of flow of the laser gas;
   (c) a gas feed conduit connected at one end to said spiral guide adjacent said other end thereof; and
   (d) a gas supply connected to the other end of said gas feed conduit to cause gas to flow therethrough to said spiral guide which imparts a helical component to a portion of the gas flowing therethrough prior to entry into said cavity of said laser discharge tube whereby the gas is distributed relatively uniformly about the inner periphery of said inlet end of said laser discharge tube cavity to produce a substantially uniform axial flow of the laser gas ant substantially uniform power in the laser beam generated therein over the cross section of said laser discharge tube cavity, said axis of said laser tube, said helical axis of said spiral guide path, the optical axis of the laser beams, and the axis of the gas flow along the length of the discharge tube being coaxial.

2. The gas laser combination in accordance with claim 1 wherein said spiral guide is a tubular element.

3. The gas laser combination in accordance with claim 2 wherein said guide channel has a depth which is at least one fourth the diameter of the laser tube cavity.

4. The gas laser combination in accordance with claim 1 wherein said conduit includes an inlet line into said spiral guide with an axis which is tangential to the open central portion of said spiral guide.

5. The gas laser combination in accordance with claim 1 wherein said inlet line for the laser gas to said spiral guide is a tubular inlet line with its axis angularly oriented in the direction of flow of the gas in said spiral guide.

6. The gas laser combination in accordance with claim 1 wherein said spiral guide path is a multi-turn spiral channel.

7. The gas laser combination in accordance with claim 6 in which said spiral channel has a constant diameter substantially equal to that of said discharge tube cavity.

8. The gas laser combination in accordance with claim 7 in which said spiral channel has a constant spiral pitch.

* * * * *

UNITED STATES PATENT AND TRADEMARK OFFICE
CERTIFICATE OF CORRECTION

PATENT NO.     : 6,665,327 B1                                        Page 1 of 1
DATED          : December 16, 2003
INVENTOR(S)    : Michael Von Borstel and Detlef Henschler It is certified that error appears in the above-identified patent and that said Letters Patent is hereby corrected as shown below:

Column 6,
Line 1, delete "ant" and substitute -- and --

Signed and Sealed this

Third Day of February, 2004

JON W. DUDAS
*Acting Director of the United States Patent and Trademark Office*